United States Patent [19]

Capps

[11] Patent Number: 5,579,467
[45] Date of Patent: Nov. 26, 1996

[54] METHOD AND APPARATUS FOR FORMATTING A COMMUNICATION

[75] Inventor: Stephen P. Capps, San Carlos, Calif.

[73] Assignee: Apple Computer, Inc., Cupertino, Calif.

[21] Appl. No.: 406,640

[22] Filed: Mar. 16, 1995

Related U.S. Application Data

[63] Continuation of Ser. No. 889,721, May 27, 1992, abandoned.

[51] Int. Cl.$^6$ ............................................. G06F 17/27
[52] U.S. Cl. ............................................ 395/768; 395/326
[58] Field of Search ........................... 395/161, 148–149, 395/117; 364/419.04, 419.1, 419.19; 358/402, 440

[56] References Cited

U.S. PATENT DOCUMENTS

| | | | |
|---|---|---|---|
| 4,687,353 | 8/1987 | DeGeorge et al. | 395/148 X |
| 4,918,723 | 4/1990 | Iggulden et al. | 379/100 |
| 4,965,763 | 10/1990 | Zamora | 364/419.19 |
| 4,970,665 | 11/1990 | Doi et al. | 395/148 |
| 5,033,008 | 7/1991 | Barker et al. | 395/148 |
| 5,043,891 | 8/1991 | Goldstein et al. | 364/419.1 |
| 5,115,326 | 5/1992 | Burgess et al. | 358/440 |
| 5,173,853 | 12/1992 | Kelly et al. | 364/419 |
| 5,175,684 | 12/1992 | Chong | 364/419.04 |
| 5,212,789 | 5/1993 | Rago | 395/600 |
| 5,220,649 | 6/1993 | Forcier | 395/148 |
| 5,227,970 | 7/1993 | Harris | 364/419.1 |
| 5,228,121 | 7/1993 | Fontaine et al. | 395/148 X |
| 5,247,591 | 9/1993 | Baran | 358/402 X |
| 5,251,314 | 10/1993 | Williams | 364/419.1 X |
| 5,278,955 | 1/1994 | Forté et al. | 395/200 |
| 5,283,887 | 2/1994 | Zachery | 364/419.1 X |
| 5,287,444 | 2/1994 | Enescu et al. | 395/148 |
| 5,299,305 | 3/1994 | Oomae et al. | 395/149 |
| 5,303,042 | 4/1994 | Lewis et al. | 348/14 |
| 5,313,394 | 5/1994 | Clapp | 364/419.1 |
| 5,339,421 | 8/1994 | Housel, III | 395/700 |
| 5,353,222 | 10/1994 | Takise et al. | 395/148 X |
| 5,384,836 | 1/1995 | Otsuka | 358/440 X |
| 5,384,886 | 1/1995 | Rourke | 395/161 |
| 5,404,294 | 4/1995 | Karnik | 364/419.1 |
| 5,450,537 | 9/1995 | Hirai et al. | 395/149 |

OTHER PUBLICATIONS

Stinson et al., Getting The Most Out Of IBM Current, 1990, pp. 3 to 6, 211 to 224.
Sullivan et al., Report Translators Show Strength, PC Week, Sep. 23, 1991, pp. 84 to 87.
Hampshire, dbPublisher, EXE, Sep. 1989, vol. 4 No. 4, pp. 24 to 27.

(List continued on next page.)

*Primary Examiner*—Heather R. Herndon
*Assistant Examiner*—Anton W. Fetting
*Attorney, Agent, or Firm*—Hickman Beyer & Weaver

[57] ABSTRACT

A method for automated preparation of a formal communication, in a format such as a facsimile transmission, a letter or a memorandum, from an text object, a graphics object or a general object received by a computer system. The computer system examines the object information and determines (1) the desired format for the communication and (2) the information to be included in the body or substance of the communication. A given format, such as a facsimile transmission, has a corresponding template and a set of associated information queries to be answered to "fill in" the template information items. The computer system determines as many answers as possible for the information queries by examining the object. Any unanswered queries may be answered by the writer or supplier of the object. The computer system then prepares the body of the communication, including identification of people, geographical locations, events, times and dates referred to in the object. A supplemental database connected to the computer system may be used to provides additional identifying information on these people, locations, events, times and dates. A replica of the formal communication may be displayed and/or edited before the communication is transmitted to the intended recipient(s).

45 Claims, 8 Drawing Sheets

OTHER PUBLICATIONS

PC Sources, Spreading the Word: Word Processing and Mail Merge, PC Sources, Oct. 1991, vol. 2, No. 10, p. 471.

Reisler, Waiting for the Mailman, Digital Review, Apr. 1, 1991, vol. 8, No. 13, p. 17.

Poor, Database Publishing Software for Ventura Yields Impressive Results, PC Magazine, Jun. 12, 1990, p. 46.

O'Connor, Rory J., "Apple banking on Newton's brain," San Jose Mercury News, Apr. 22, 1992.

Peels et al, "Document Architecture/Tex Formatting," ACM Trans. on Office Information Systems, V. 3 No. 4, 1985, pp. 347, 69.

Horak, "Office Document Architecture and Office Document Interchange Formats: Current Status of International Standardization," Computer, Oct. 1985, pp. 5–60.

Iwai, et al, "A Document Layout System Using Automatic Document Architecture Extraction," ACM Conf. Proceedings on Human Factors in Computing Systems, 1989, pp. 396 74.

Furuta et al. "Document Formatting Systems: Survey, Concepts, and Issues," Computing Surveys, v. 14, No. 3, Sep. 1982, pp. 417–472.

FIG. 7

FACSIMILE TRANSMISSION

RECIPIENT:
FAX No.:
DATE SENT:

SENDER:
SENDER TELEPHONE No.:

WITH REFERENCE TO:

THIS FAX MESSAGE CONSISTS OF THIS COVER PAGE PLUS ___ OTHER PAGES.

⟨BODY⟩

FIG. 8

LETTERHEAD, IF ANY

DATE:

ADDRESSEE NAME:
ADDRESSEE ADDRESS:
WITH REFERENCE TO:

DEAR (ADDRESSEE NAME)

⟨BODY⟩

YOURS TRULY
SENDER NAME AND AFFILIATION

FIG. 9

MEMORANDUM TO:
ADDRESSEE NAME:
ADDRESSEE ADDRESS:

FROM: SENDER NAME AND AFFILIATION
WITH REFERENCE TO:

⟨BODY⟩

METHOD AND APPARATUS FOR FORMATTING A COMMUNICATION

This is a continuation of application Ser. No. 07/889,721 filed May 27, 1992, abandoned.

BACKGROUND OF THE INVENTION

This invention relates to text and graphics reformatters, and more particularly to automated form preparation on a computer.

A person will often write the body of a communication before formatting the communication for transmittal. For example, a person might write the body of a letter before he formats the letter with the recipient's name and address, salutation, etc. The formatting process can be quite time consuming if the letter writer has to call up an appropriate letterhead, look up addresses, etc. The same problem exists for other format structures, such as facsimile formats and memorandum formats. Furthermore, the writer might want the same body of text transmitted in a number of different formats, causing a duplication of labor.

An attractive alternative to a manual formatting approach is to use a computer system to assist in reformatting of the information contained in such a note or other entered information. This information may be pure text (referred to here as a "text object") or pure graphics (referred to here as a "graphics object") or may be an unspecified mix, possibly containing both text and graphics and possibly other object types (referred to here as an "object").

Furuta et al., in "Document Formatting Systems: Survey, Concepts and Issues, Computing Surveys, vol. 14, 1982, pp. 417–472, discuss approximately 30 text formatting systems and related document processing concerns. Ordered and unordered objects are distinguished from each other, and abstract and concrete objects are likewise distinguished.

Peels et al. in "Document Architecture and Text Formatting", A.C.M. Trans. on Office Information Systems, vol. 3, 1985, pp. 347–369, discuss machine reformatting of a source text that is already in machine-readable form, using their COBATEF system. The authors introduce definitions for basic text elements, such as paragraphs, lists, quotations, formulae, figures and tables, and formatting aids, such as margins, headers, footers and indices. Line break and hyphenation algorithms are also discussed. The COBATEF system first converts the text into a logical structure, then performs horizontal and vertical formatting.

Horak, in "Office Document Architecture and Office Document Interchange Formats: Current Status of International Standardization", Computer, October 1985, pp. 50–60, discusses a document architecture (ODA) and office document interchange format (ODIF) models adopted or modified by the Committee Consultatif International de Telegraph et Telephone, by the International Standardization Organization, and by the European Computer Manufacturers Association. A logical tree structure is used for layout, and logical objects and layout objects are distinguished in formatting of a document.

Iwai et al, in "A Document Layout System Using Automatic Document Architecture Extraction", A.C.M. Conference Proceedings on Human Factors in Computing Systems, 1989, pp. 369–374, discuss and contrast the COBATEF system and their own automatic text, table and figure layout system.

Iggulden and Streck, in U.S. Pat. No. 4,918,723, disclose a keyboard-to-facsimile transmission system that permits direct input of alphanumeric characters and document delimiters to a facsimile transmission machine. Various QWERTY keyboards are illustrated for use with the system. Addressee information is explicitly input by the system operator.

None of the above-mentioned computer systems: (1) explicitly allow a choice of different communication formats; (2) allow supplementation, by an accessible database, of the information explicitly entered by the operator; (3) allow information entry by a variety of input approaches, such as pen-and-tablet, keyboard, on-board storage, etc.; or (4) provide for recognition of implicit information, such as addressee names, other person's names, locations, events, dates and times within the entered information.

What is needed is a system that allows automatic preparation a formatted document utilizing, in part, the information contained in the original structured or unstructured body of text. Preferably, this system would allow a choice of any of several formats for the formal memorialization, and would allow rapid conversion between the various formats. It would preferably also be able to complete required information in the formatted document from partial or fragmentary information in the original body of text.

SUMMARY OF THE INVENTION

These needs are met by a computer system that can take a text object and automatically format the object in a variety of ways using, in part, information in the text object to complete required portions of the form. The invention is applicable to text objects, to graphics objects and to general objects.

A writer uses entry means to enter information into a computer system, preferably by printing the information on a display pad of a pen-based computer system. Optionally, the information can be entered by a keyboard or other information entry means or may already be stored in the computer system. The computer system receives the entered information and determines which format (letter, memorandum, fax transmission, etc.) the writer has chosen for formal memorialization of the communication, either by explicit format choice or implicitly, based upon language used in the object. This format might be determined implicitly, for example, by appearance of a word or phrase such as "letter to," "send to," "memo for" or "fax to" in the body of the text.

Once the format is determined, explicitly or implicitly, the computer system provides a template corresponding to that format. The template requires that certain information items, in addition to the body or message of the communication, be provided for completeness. Each such required information item becomes a query, and the computer system examines the entered information or "object" to determine if the required query information is present. If this item is present, the query information is entered at the appropriate template location, and the next query is called up. If this query information item is not present in the object, the computer system notes that this item is missing and calls up the next query.

Optionally, if the required information is present, possibly in abbreviated form, the computer system consults a database and provides a full entry, such as a full name and mailing address, that can be entered at the appropriate location on the template. For example, the queries associated with a fax transmission may include (1) addressee name, (2) addressee telephone number for facsimile transmission, (3) addressee mailing address and/or telephone number, (4)

sender name and telephone number, (5) number of pages in fax transmission, (6) time and date the facsimile transmission is sent, and (7) subject of the facsimile transmission. Letter or memorandum queries are similar.

The present invention: (1) allows explicit or implicit choice of a communication format from among several formats; (2) provides an appropriate template for the communication format chosen; (3) identifies the intended addressee(s) and other relevant information for the template from the object information; (4) supplements the object information with relevant information from an accessible database; and (5) recognizes the presence of times and dates in the object information, for possible special treatment in the message to be communicated. The computer system performs these tasks automatically, with no human intervention required after the object information is received by the system and there is some indication from the user that formatting is desired. The communication may also be displayed in the format chosen, for possible editing before transmission of the communication.

BRIEF DESCRIPTION OF THE DRAWINGS

FIGS. 7, 8 and 9 are examples of templates suitable for use with a facsimile transmission, a letter and a memorandum, respectively.

DETAILED DESCRIPTION OF THE PREFERRED EMBODIMENTS

Figure 1:
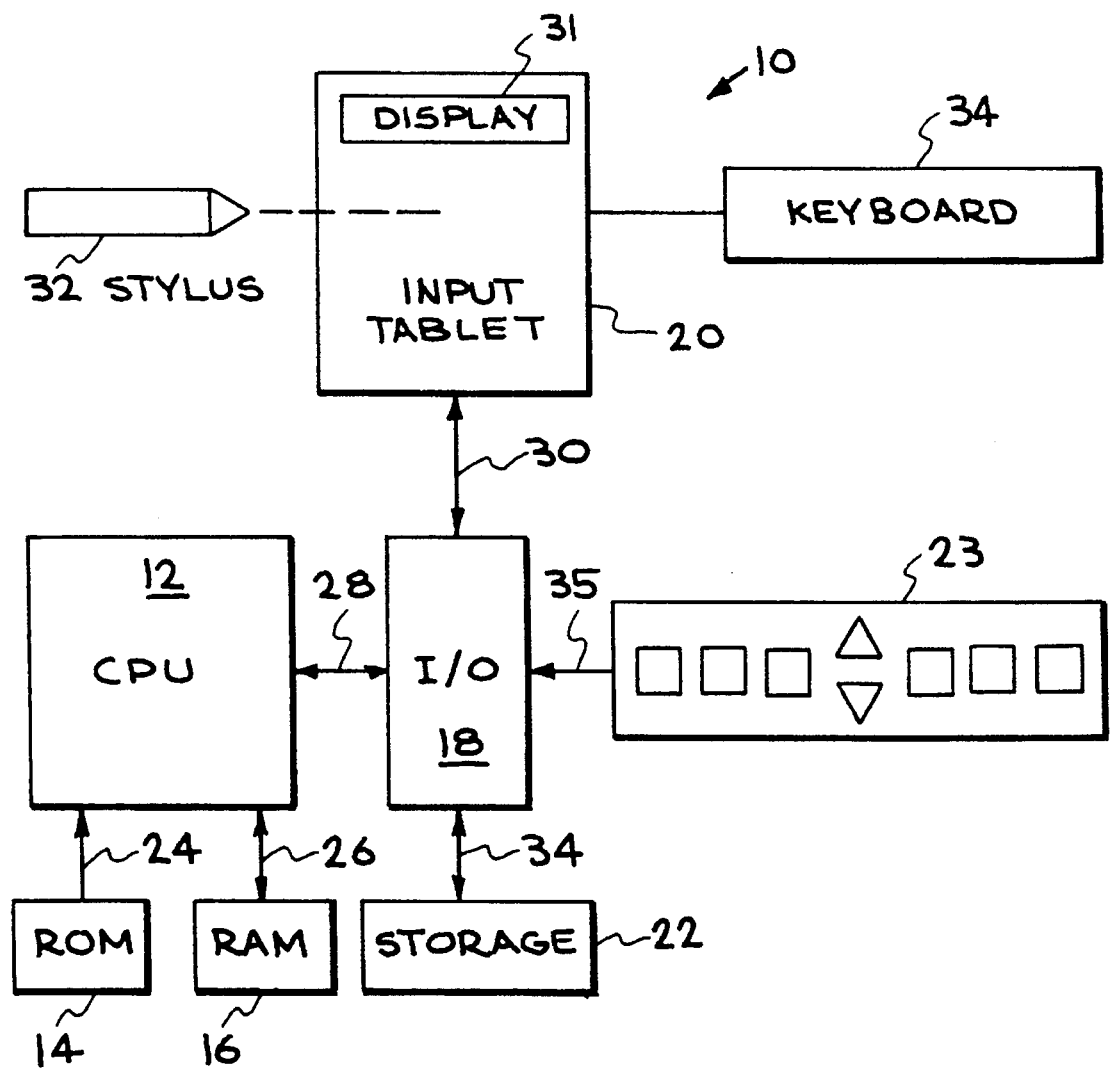
FIG. 1 is a block diagram of a computer entry system constructed to practice the invention.

In FIG. 1, a pen-based computer system 10, constructed to assist practice of the present invention, includes a central processing unit (CPU) 12, a read only memory (ROM) 14, a random access memory (RAM) 16, input/output (I/O) circuitry 18, and a display assembly 20. The computer system 10 may optionally include a mass storage unit 22, such as a disk drive unit or non-volatile memory such as flash memory, and an array of input buttons 23. The computer system 10 need not be pen-based. Some other information entry means may be provided for the writer to enter the information, for example, a keyboard 25.

The CPU 12 is preferably a commercially-available, single chip microprocessor. Although the CPU 12 can be a complex instruction set computer (CISC) chip, it is preferable that CPU 12 be one of the commercially available, low power, reduced instruction set computer (RISC) chips. The CPU 12 is coupled to the ROM 14 by a unidirectional data bus 24. The ROM 14 contains the basic operating system for the computer system 10. The CPU 12 is connected to the RAM 16 by a bi-directional data bus 26 to permit the use of the RAM 16 as a scratch pad memory. The ROM 14 and RAM 16 are also coupled to the CPU 12 by appropriate control and address buses, as is well known to those skilled in the art. The CPU 12 is further coupled to the I/O circuitry 18 by a bi-directional data bus 28 to permit data transfers with peripheral devices.

The I/O circuitry 18 typically includes a number of latches, registers and direct memory access (DMA) controllers. The I/O circuitry 18 provides an interface between the CPU 12 and such peripheral devices as the display assembly 20, the mass storage 22, and the array of input buttons 23.

The display assembly 20 of the computer system 10 is both an input and an output device. Accordingly, the assembly 40 is coupled to the I/O circuitry 18 by a bi-directional data bus 30. When the display assembly operates as an output device, the display assembly receives data from the I/O. circuitry 18 via the bus 30 and displays that data on a suitable display screen 31. The screen 31 for the display assembly 20 is preferably a liquid crystal display (LCD) of the type commercially available from a variety of manufacturers. The input device of the display assembly 20 is preferably a thin, clear membrane that covers the display screen 31 and that is sensitive to the position of a stylus 32 touching its surface. These position-sensitive membranes are also readily available on the commercial market. Combination display assemblies, such as a display assembly 20 that includes both the LCD and the input membrane, are commercially available from such vendors as Scriptel Corporation of Columbus, Ohio.

Other types of pointing devices can also be used in conjunction with the present invention. Although the method of the present invention is described in the context of a pen-based system, other pointing devices such as a computer mouse, a track ball, or a tablet can be used to manipulate a pointer on a screen. As used herein, the terms "pointing devices," "pointing means," and the like will refer to any mechanism or device for pointing to a particular location on a screen of a computer display.

Some type of mass storage 22 is generally considered desirable. However, the mass storage 22 can be eliminated by providing a sufficient amount of ROM 14 and RAM 16 to store user application programs and data. In that instance, the RAM 16 could be provided with a back-up battery to prevent the loss of data even when the pen-based computer system 10 is turned off or loses power.

In operation, information is entered into the computer system 10 by "writing" on the screen of the display assembly 20 with the stylus 32. Alternatively, information can be input into the computer from other sources such as from keyboard 25. Information concerning the location of the stylus 32 on the screen 31 of the display assembly 20 is entered into the CPU via I/O circuitry 18. The CPU 12 then processes the data under control of an operating system and possibly an application program stored in the ROM 14 and/or the RAM 16. The CPU then produces data that are fed to the display assembly 20 to produce appropriate images on its screen.

Figure 2:
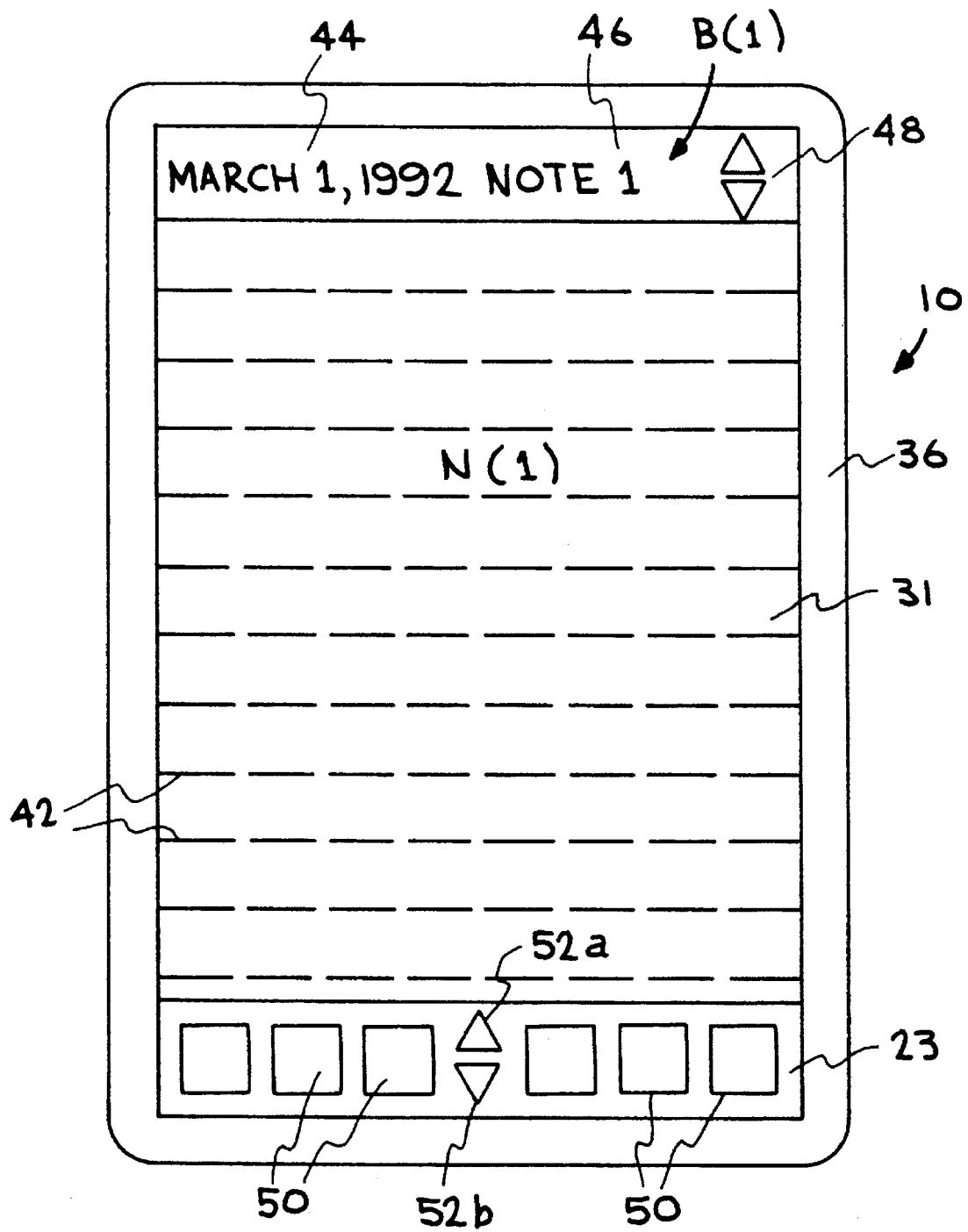
FIG. 2 is a presentation of a screen display assembly for practice of the invention.

In FIG. 2, a pen-based computer system 20 is shown housed within a generally rectangular enclosure 36. The CPU 12, ROM 14, RAM 16, I/O circuitry 18, and mass storage 22 are preferably enclosed within the enclosure 36. The display assembly 20 is mostly enclosed within the enclosure 36, but viewing screen 31 of the display assembly is exposed to the user. As used herein, the term "screen" will refer to the portion of the display assembly 20 that can display an image that can be viewed by a user. The array of input buttons 23 is also accessible to the user.

Upon power-up of the system, the pen-based computer system 10 displays on screen 31 an initial note area N(1) including a header bar B(1) and a plurality of guidelines 42. The header bar B(1) preferably includes the date of creation 44 of the note N(1), a note number 46, and a sizing "button" 48. The optional guidelines 42 aid a user in entering text, graphics, and data into the pen-based computer system 10. In this preferred embodiment, the input buttons 23 are not part of the screen 31, but, rather, are permanent, hard-wired input buttons coupled to the CPU 12 by the I/O circuitry 18. Alternatively, the array of input buttons 23 could be "soft" buttons generated at a convenient location on the screen 31, in which case a button would be activated by touching the stylus 32 to the screen 31 over the image of a button. The array of input buttons 23 preferably includes a number of dedicated function buttons 50 and a pair of scroll buttons 52A and 52B. One or more buttons of the array of buttons 23 may allow an explicit choice of communication format to be used, overriding any choice made by the system.

As used herein, the phrase "formal communication" or "communication" refers to a formatted, written document, in a format such as a facsimile transmission, business letter or memorandum, addressed to one or more addressees, and containing a body of information to be communicated to the addressee(s).

Figure 3A:
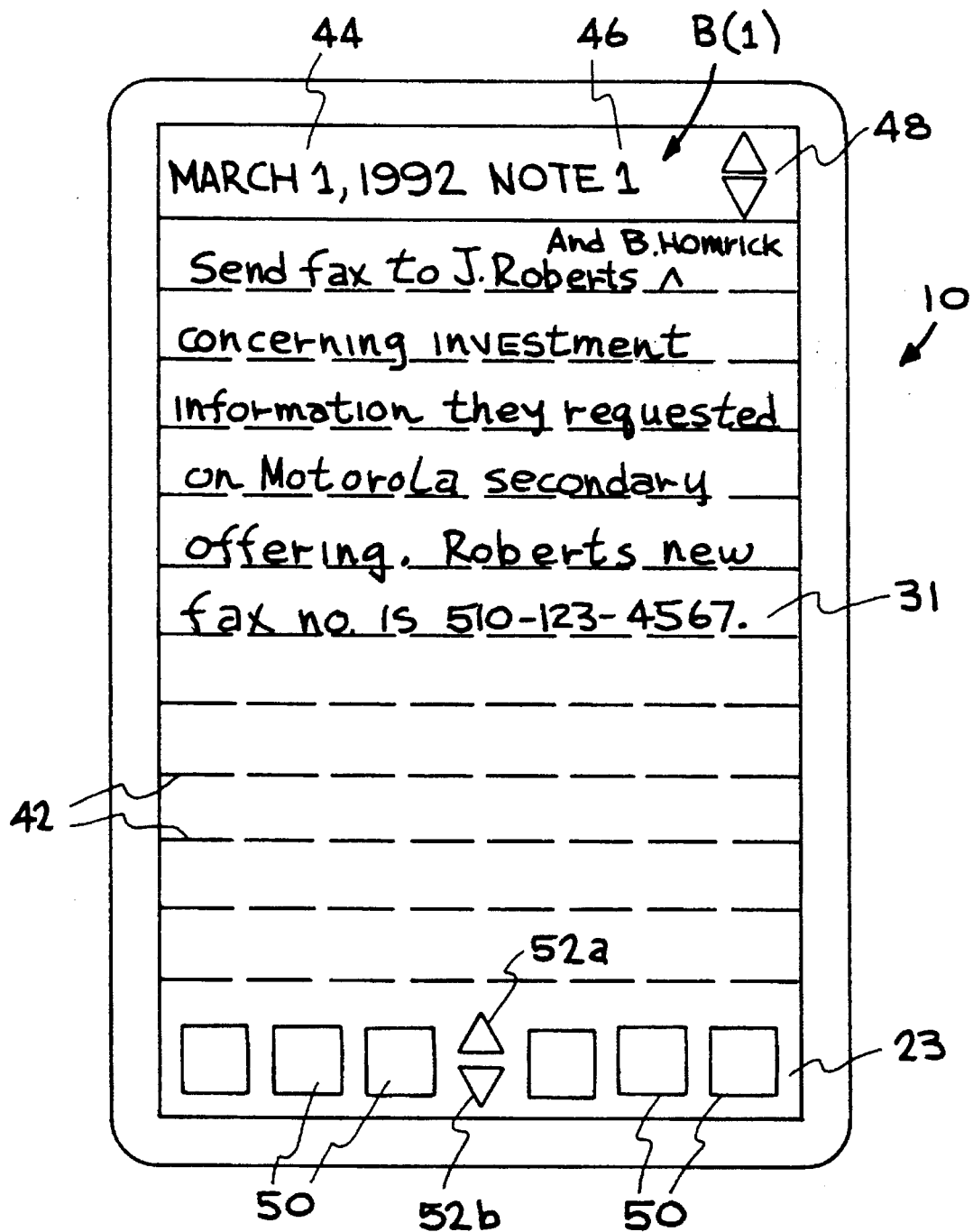
FIGS. 3A and 3B views of the assembly of FIG. 2 with suitable information included on the display area to prepare a communication according to the invention.

FIG. 3A illustrates the display screen 31 of FIG. 2 with some text information entered. The related words of this text information is often referred to as a text object. The writer may explicitly choose a communication format by depressing one or more of the input buttons 23. The available choices here include facsimile transmission form, business letter form, and memorandum (memo) form.

Alternatively, the system will attempt to determine a format which is implicitly chosen. The text object is analyzed to determine (1) the choice of format for the communication (facsimile, letter, memorandum, etc.), (2) the addressee(s) and related identifying information, and (3) the body or substance of the communication.

In FIG. 3A, the implicit format is a facsimile transmission, the "addresses" (i.e. identifiers of the destinations of the communication) are J. Roberts and B. Hamrick, the facsimile number for the communication is 510-123-4567, and the body or message of the communication is to include investment information (to be obtained elsewhere) on a secondary offering of Motorola stock. Optionally, the computer system can consult an accessible database that includes other relevant information for the addressee(s). The actual information to be sent to the addresses is merely referred to here, and would presumably be pulled from a file for facsimile transmission by a simple database query. However, most or all of the information for the body of the communication may instead appear on the screen in FIG. 3A, and the computer system will identify and format this information. The information entered by the writer on the screen is not limited to one screenful. The screen may be scrolled using buttons 52a and 52b to enter more information concerning the text object than can be displayed on one screen.

Figure 3B:
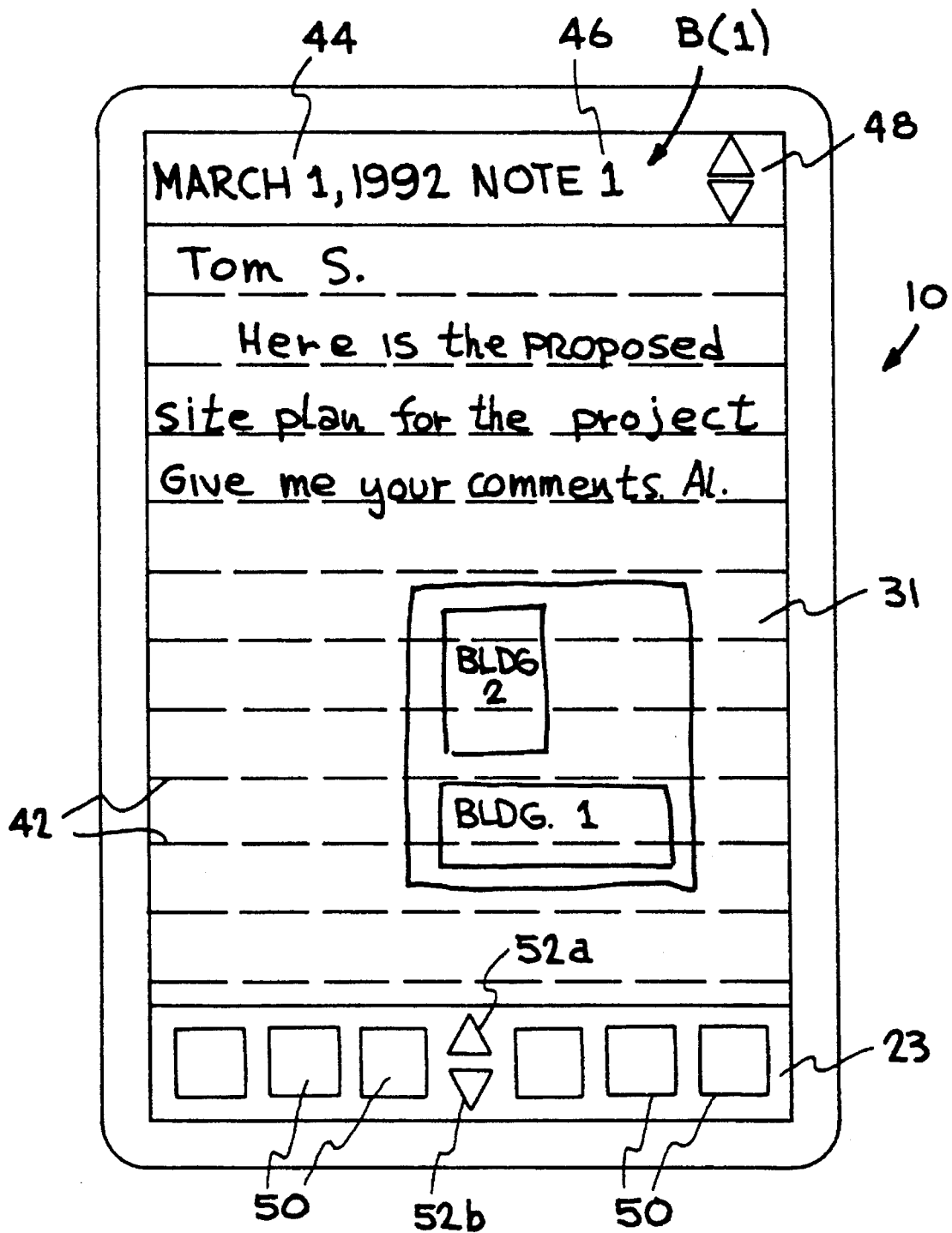

FIG. 3B illustrates the display screen 31 of FIG. 2 displaying a "general" object comprising both a text object and a graphic object. The system recognizes and distinguishes between text objects and graphic objects automatically. The text object is analyzed by character recognition software (well known to those skilled in the art of pen-based computer systems) and stored. The graphic object is analyzed and "cleaned up", by straightening line segments, smoothing curves, etc., utilizing graphic recognition domains (also known to those skilled in the art) and stored. The graphic object may be explicitly positioned within or adjacent to the text by the writer.

Figure 4:
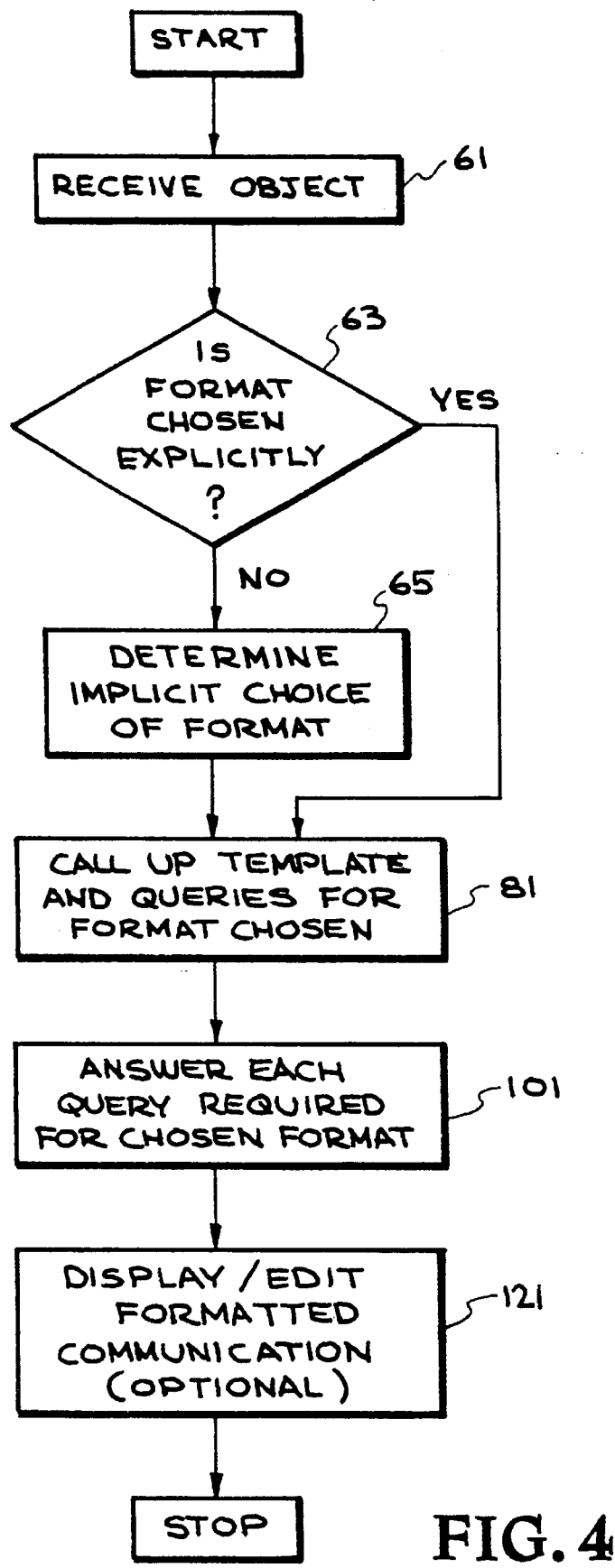
FIG. 4 is a flow diagram illustrating a method for obtaining the required query information to prepare a communication according to the invention.

FIG. 4 illustrates a flow diagram of a preferred embodiment of the invention. The computer system 10 of FIG. 1 receives the object in Step 61. It should be noted that the object can be a free-form text object, or may already be formatted as a formal communication. In the latter case, the method of the present invention can convert the formatted communication to another form, e.g. from a fax to a letter to a memorandum form.

The information comprising the object is preferably entered by the writer on the display screen 31 by use of stylus 32, or through some other information entry means. If a choice of format is not indicated explicitly, in Step 63, the computer system examines the object information in Step 65 to determine the implicitly desired format of the communication and proceeds to Step 81. If a format is chosen explicitly, the system proceeds directly from Step 63 to Step 81. One method for explicitly choosing a format is to provide icons on the bottom of screen 31 just above one or more of the buttons 50 of the array of buttons 23 (See FIGS. 2, 3A, and 3B). For example, one of the buttons 50 can be beneath an icon of a letter, indicating that the pressing of that button 50 will format the text object as a letter.

Once the format is identified, the corresponding template and associated queries are identified and called up for the communication in Step 81. Information that answers each of the associated queries is then sought in the object in Step 101. Once all queries for which information is available have been answered, the desired communication is optionally displayed and/or edited in the chosen format on a display screen, such as the screen 31 shown in FIG. 1, in Step 121. Any query that could not be answered may be flagged or otherwise brought to the attention of the writer for entry of the missing information in the communication.

Figure 5:
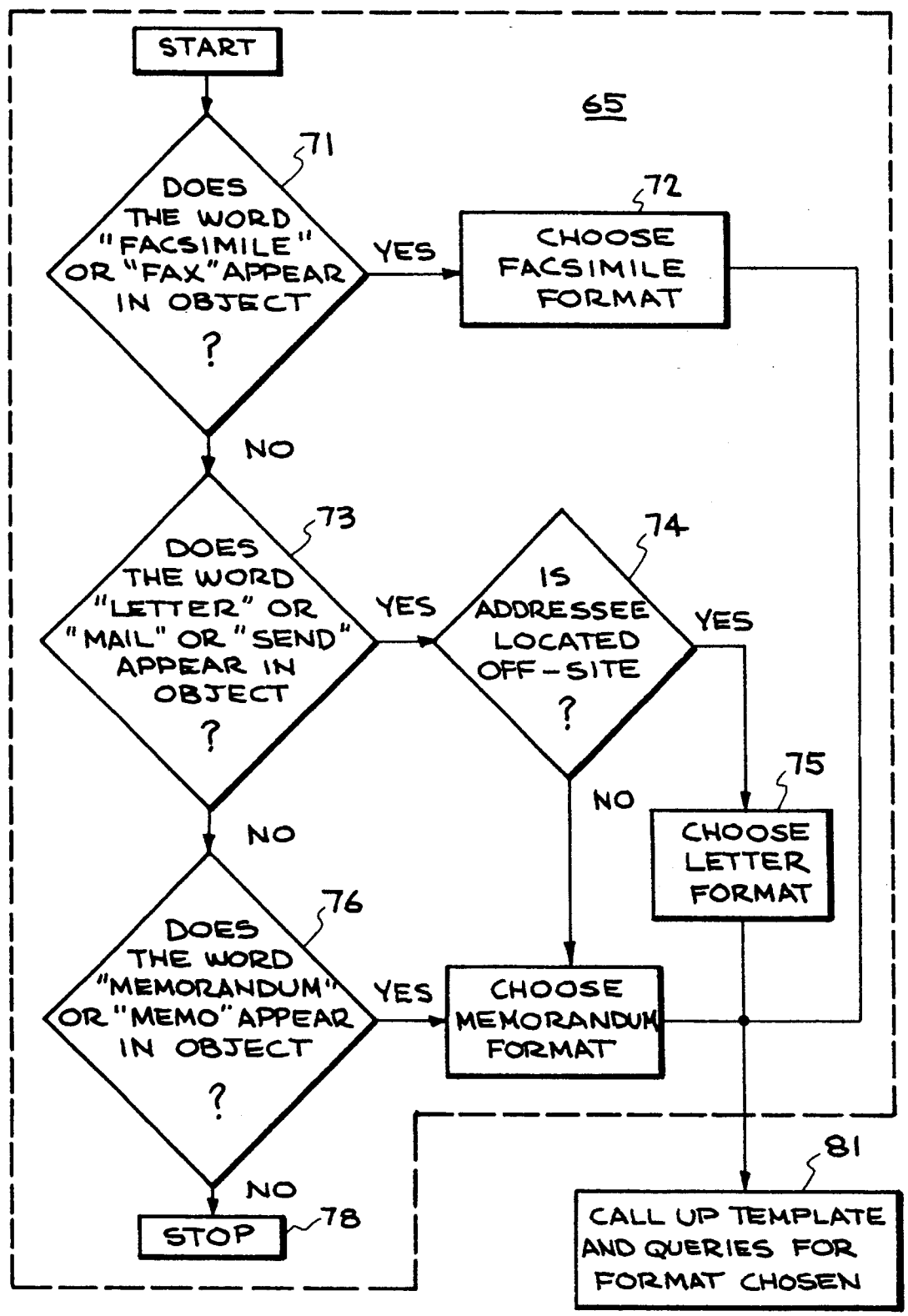
FIGS. 5 and 6 are more detailed flow diagrams of two steps in the flow diagram of FIG. 4.

FIG. 5 illustrates the Step 65 of FIG. 4 in more detail. If the word "facsimile" or "fax" appears in the entered information (Step 71), the computer system chooses a facsimile format in Step 73. If the word "letter" or "send" or "mail" appears in the entered information, but not the words "facsimile" or "fax" (Step 73), and if the addressee (found by a subsequent search of the object through a query) is not present at the same site where the writer is located (Step 74), the computer system chooses a letter format in Step 75. Proceeding from Step 74, if the addressee is located off-site, the computer system chooses the memorandum format in Step 77. If none of the words "facsimile", "fax", "letter", "send" or "mail" appears in the object but the word "memorandum" or "memo" appears in the object, the computer system chooses the memorandum (or report) format in Step 77. If none of the words "facsimile", "fax", "letter", "mail", "send", "memorandum" or "memo" appears in the object, the computer system proceeds to Step 78, stops and awaits entry of additional format information by the writer. Based on the choices made in Steps 72, 74 or 77, the format, format template and queries list are then determined and called up in Step 81.

@ @ @ @

Figure 6:
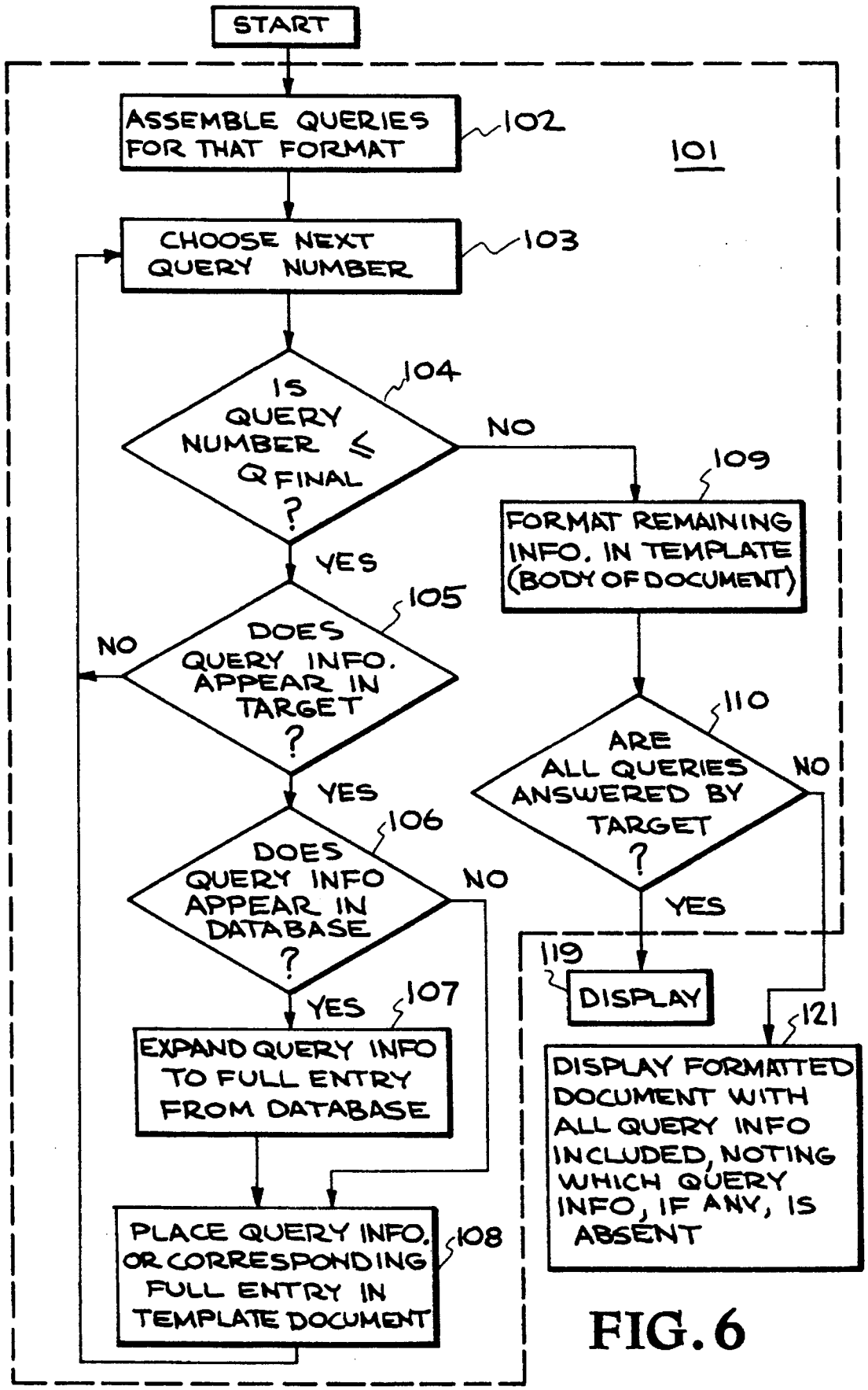

FIG. 6 illustrates the Step 101 of FIG. 4 in more detail. In Step 102, the associated queries for the chosen format are assembled and assigned consecutive positive integers $Q=Q_i$, $Q_{i+1}, \ldots, Q_{final}$ as query indices. Initially, the query index Q is set equal to its initial value $Q_i$. Step 103, the beginning of a Do Loop, the next (or first) query index Q and corresponding query are chosen. In Step 104, the computer system determines whether $Q \leq Q_{final}$. If Q is $\leq Q_{final}$, in Step 105 the computer system determines whether the query information for query index Q appears in the object. If this query information is not found in the object, the computer system notes the absence of this information, increments Q by one (Q=Q+1), and returns to Step 103.

If this query information is found in the object, the system determines whether the query information appears in a user database in a Step 106. If it does not, the computer system adds this query information to the template at the appropriate template location in Step 108. Optionally, in a Step 107, the computer system can attempt to expand this query information to a full template entry by consulting an associated database, using this query information as an identifier. For example, with reference to FIG. 3A, each of the addressee names that appear there, J. Robert and B. Hamrick, may be expanded to a full entry including full name, mailing address, telephone number, fax number, and other relevant information by consulting an appropriate database, using each of the addressee names shown in FIG. 3A as an initial identifier.

After query information (or corresponding full entry from a database) for query index Q is placed in an appropriate position in the chosen template in Step 108, the computer system increments the query index Q by one (Q=Q+1) and returns to Step 103. At some point, this increment first produces a query index $Q=Q_{final}+1$, and the answer to the question "Is Query Number$\leq Q_{final}$?" becomes "No" in Step 104. At this point, all query information available in the object has been identified and placed in the chosen template. The remainder of the information in the object is assumed to be substance or content for the communication itself, i.e. the body of the communication. This remainder is formatted and placed in the body or message of the communication in Step 109.

The computer system then determines, in Step 110, if all required query information has been obtained from the object. If the answer is "Yes," the formatted communication (facsimile transmission, letter, memorandum, etc.) is displayed with all query information included in step 119. If a portion of the required query information is missing, the computer system also displays the intended communication in a step 121 and also indicates on the display screen which query information is missing. The writer can then supply the missing information, if any, before the communication is prepared and sent.

FIGS. 7, 8 and 9 illustrate templates suitable for use when the communication format selected is a facsimile transmission, a letter and a memorandum, respectively.

The queries associated with a given choice of format include a first set of primary information items and a second set that includes optional information items. For a choice of the facsimile format, suitable queries are as follows:

Format: facsimile
  First level queries
    Addressee fax number
  Second level queries
    Addressee name
    Addressee mailing address
    Addressee telephone number
    Number of pages in facsimile transmission
    Date facsimile is transmitted
    Sender name, telephone number and affiliation
    Sender fax number
    Subject of fax transmission For a choice of the letter format, suitable queries are as follows:

Format: letter
  First level queries
    Addressee mailing address
  Second level queries
    Addressee name
    Date letter is sent
    Sender name, mailing address and affiliation
    Subject of letter For a choice of the memorandum format, suitable queries are as follows:

Format: memorandum
  First level queries
    Addressee mailing address (mail station, etc.)
  Second level queries
    Addressee name
    Date memorandum is sent or prepared
    Sender name, mailing address and affiliation
    Subject of memorandum In order to determine what format is chosen, the computer system first looks for a "format" word, such as "facsimile," "fax," "send," "mail," "letter," "memorandum," "memo", etc. If such a word is present, the analysis proceeds as in FIG. 5. The intended addressee's name, if any, would likely appear within, say, five words of the corresponding "format" word, and one of the connecting words may be "for" or "to." An example is shown in the entered message shown in FIG. 3A ("Send fax to J. Roberts and B. Hamrick . . . ").

After the chosen format is identified, the computer system, optionally, identifies five classes of information items within the object: persons, (geographic) locations, events, times and dates. With reference to the first class, persons, the computer system looks for proper names (usually capitalized) within the object, ignoring the articles, connectives and similar words such as "a," "the," "there," "and," "or," "but," "however," etc. From the remainder of words in the object, after removal of the articles, connectives and proper nouns, the computer system searches for location words, from a list of cities, towns and other relevant locations that are, optionally, stored in an accessible database. After removal of the articles, connectives, proper nouns and location words from the object, the computer system searches for dates and times contained in the remainder of the object words, using an algorithm discussed below. After the time and date words are also removed from the object words, the computer system searches for event words contained in the remainder, from a list of such events that are, optionally, stored in an accessible database. The order of the five inquiries above is not critical here. The content(s) of the accessible database(s) containing the proper names, locations and events are discretionary with the writer or system user.

The computer system can rely on algorithms or heuristic reasoning to recognize the presence of a time in one of its many different styles. If any one of the following questions is answered affirmatively, the system determines that the appropriate word or phrase within the object refers to a time. Here the symbols a, b, c, d, e, f, g, h, j, k, m and n each represent a blank space ("sp") or a numerical digit (0, 1, 2, 3, 4, 5, 6, 7, 8 and 9), as indicated. The order in which these questions are posed is immaterial.

1. Is the word or phrase of the form ab:cd with
  a=sp, 0, 1, or 2 (conventional or military time)
  b=0, 1, 2, . . . , 8, or 9
  c=1, 2, 3, 4, or 5
  d=0, 1, 2, . . . , 8, or 9?

2. Is the word or phrase of the form ab:cd (am or pm) with
  a=sp, 0 or 1
  b=0, 1, 2, . . . , 8, or 9
  c=0, 1, 2, 3, 4, or 5
  d=0, 1, 2, . . . , 8, or 9?

3. Is the word or phrase of the form of "minutes before gh" or "minutes after gh" with
   e=sp, 0, 1, 2, 3, 4, or 5
   f=0, 1, 2, ..., 8, or 9
   g=sp, 0, 1, or 2
   h=0, 1, 2, ..., 8, or 9?
4. Is the word or phrase of the form "jk o'clock" with
   j=sp, 0, 1, or 2
   k=0, 1, 2, ..., 8, or 9?
5. Is the word or phrase of the form "12 noon" or "12 midnight"?
6. Is the word or phrase of the form "mn fifteen" or "mn thirty" or "mn forty-five" with
   m=sp, 0, 1, or 2
   n=0, 1, 2, ..., 8, or 9?

The computer system also relies upon algorithms or heuristic reasoning to recognize the presence of a date that takes account of many different styles used to refer to a specific date. If any one of the following questions is answered affirmatively, the system determines that the appropriate word or phrase within the object refers to a date. Here the symbols a, b, c, d, e, f, g, h, j, k, m, n, p, q, r, s, t, u, v and w each represent a blank space ("sp") or a numerical digit (0, 1, 2, 3, 4, 5, 6, 7, 8 and 9), as indicated. The order in which these questions are posed is immaterial.

1. Is the word or phrase of the form ab/cd/efgh, where a, b, c, d, e, f, g and h are characters satisfying the constraints
   a=(space), 0, or 1,
   b=0, 1, or 2,
   c=(space), 0, or 1,
   d=0, 1, 2, ..., or 9,
   e=(space), 1, or 2,
   f=(space), 0, 1, 2, ..., or 9,
   g=0, 1, 2, ..., or 9, and
   h=0, 1, 2, ..., or 9?
2. Is the word or phrase of the form ab-cd-efgh, where a, b, c, d, e, f, g and h are characters satisfying the constraints
   a=(space), 0 or 1,
   b=0, 1 or 2,
   c=(space), 0, 1, 2 or 3,
   d=0, 1, 2, ..., or 9,
   e=(space), 1 or 2,
   f=(space), 0, 1, 2, ..., or 9,
   g=0, 1, 2, ..., or 9, and
   h=0, 1, 2, ..., or 9?
3. Is the word or phrase of the form ab/cd/efgh, where a, b, c, d, e, f, g and h are characters satisfying the constraints
   a=(space), 0, 1, 2 or 3,
   b=0, 1, 2, ..., or 9,
   c=(space), 0 or 1,
   d=0, 1 or 2,
   e=(space), 1 or 2,
   f=(space), 0, 1, 2, ..., or 9,
   g=0, 1, 2, ..., or 9, and
   h=0, 1, 2, ..., or 9?
4. Is the word or phrase of the form ab-cd-efgh, where a, b, c, d, e, f, g and h are characters satisfying the constraints
   a=(space), 0, 1, 2 or 3,
   b=0, 1, 2, ..., or 9,
   c=(space), 0 or 1,
   d=0, 1 or 2,
   e=(space), 1 or 2,
   f=(space), 0, 1, 2, ..., or 9,
   g=0, 1, 2, ..., or 9, and
   h=0, 1, 2, ..., or 9?
5. Is the word or phrase of the form (word1)/jk/mnpq or jk/(word1)/mnpq, where j, k, m, n, p and q are characters and word1 is a word or abbreviation satisfying the constraints
   j=(space), 1, 2 or 3,
   k=0, 1, 2, ..., or 9,
   m=(space), 1 or 2,
   n=(space), 0, 1, 2, ..., or 9,
   p=0, 1, 2, ..., or 9,
   q=0, 1, 2, ..., or 9, and
   word1=jan, january, feb, february, mar, march, apr, april, may, jun, june, jul, july, aug, august, sep, sept, september, oct, october, nov, november, dec or december?
6. Is the word or phrase of the form (word2)-jk-mnpq or jk-(word2)-mnpq, where j, k, m, n, p and q are characters and word2 is a word or abbreviation satisfying the constraints
   j=(space), 1, 2 or 3,
   k=0, 1, 2, ..., or 9,
   m=(space), 1 or 2,
   n=(space), 0, 1, 2, ..., or 9,
   p=0, 1, 2, ..., or 9,
   q=0, 1, 2, ..., or 9, and
   word2=jan, january, feb, february, mar, march, apr, april, may, jun, june, jul, july, aug, august, sep, sept, september, oct, october, nov, november, dec or december?
7. Is the word or phrase of the form (word3), rs, tuvw or rs (word3) tuvw, where r, s, t, u, v and w are characters and word3 is a word or abbreviation satisfying the constraints
   r=(space), 1, 2 or 3,
   s=0, 1, 2, ..., or 9,
   t=(space), 1 or 2,
   u=(space), 0, 1, 2, ..., or 9,
   v=0, 1, 2, ..., or 9,
   w=0, 1, 2, ..., or 9, and
   word3=jan, january, feb, february, mar, march, apr, april, may, jun, june, jul, july, aug, august, sep, sept, september, oct, october, nov, november, dec or december?
8. Is the word or phrase of the form (word4)-rs-tuvw or rs-(word4)-tuvw, where r, s, t, u, v and w are characters and word4 is a word or abbreviation satisfying the constraints
   r=(space), 1, 2 or 3,
   s=0, 1, 2, ..., or 9,
   t=(space), 1 or 2,
   u=(space), 0, 1, 2, ..., or 9,
   v=0, 1, 2, ..., or 9,
   w=0, 1, 2, ..., or 9, and
   word4=jan, january, feb, february, mar, march, apr, april, may, jun, june, jul, july, aug, august, sep, sept, september, oct, october, nov, november, dec or december?

The choices of first level and second level queries illustrated here are not critical. Similarly, the choices of logic used for recognition of the presence of a time or a date are not critical. The computer system optionally provides means for the person entering the information, or selecting the information to be entered, to customize the queries and their levels, the templates, the time and/or date logic, and the algorithms used to format and prepare a communication based upon the information contained in the object.

While this invention has been described in terms of several preferred embodiments, it is contemplated that various alterations and permutations thereof will become apparent to those skilled in the art. It is therefore intended that the following appended claims be interpreted as including all such alterations and permutations as fall within the true spirit and scope of the present invention.

What is claimed is:

1. A method for creating a communication having a desired format comprising the steps of:

entering a text document into a computer system, said text document having an original format and including message content to be transmitted in a communication to an addressee, concise address information included in said message content to provide said addressee in said communication, and a format identifer, wherein said message content, said concise address information, and said format identifier are all located within a main body portion of the text document such that neither said concise address information nor said format identifier are provided in a heading separate from said message content;

determining a desired format for the communication based upon said format identifier and associating a format template with said desired communication format, said format template having an information slot and an information query associated with said information slot;

analyzing the text document based upon said information query to identify at least some of said concise address information that answers said query and fill in said information slot with database address information stored in and retrieved from a database separate from said text document, said database address information being referred to by said identified concise address information and being in greater amount and having greater detail than said identified concise address information; and creating a formatted communication having said desired format in accordance with said format template, the desired format being different from said original format, said communication including a template portion and a body portion, the template portion including at least some of said database address information filled in said identification slot, the body portion including said message content to be transmitted to said addressee.

2. The method of claim 1, wherein said step of determining said desired communication format comprises explicitly selecting said desired communication format from a selection made by a user and input into said computer system.

3. The method of claim 1, wherein said step of determining said desired format comprises determining the desired format for the communication from the message content contained in the text document.

4. The method of claim 3, wherein said step of determining said desired format for said communication comprises the steps of:

determining an addressee address to which said communication is to be transmitted;

determining that said desired format is a facsimile transmission, when at least one of the words "facsimile" or "fax" appears in said message content contained in said text document;

determining that said desired format is a letter when: (1) neither of the words "facsimile" or "fax" appears in said text document; (2) at least one of the words "letter", "send" or "mail" appears in said text document; and (3) the addressee address for transmission of said communication is not the same as the address of said computer system; and determining that said desired format is a memorandum when: (1) neither of the words "facsimile" or "fax" appears in said text document; (2) at least one of the words "letter", "send" or "mail" appears in said information contained in said text document; and (3) the addressee address for transmission of said communication is the same as the address of said computer system; and determining that said desired format is a memorandum when: (1) none of the words "facsimile", "fax", "letter", "send" or "mail" appears in said text document; and (2) at least one of the words "memorandum" or "memo" appears in said text document.

5. The method of claim 4, wherein when said desired format for said communication is a facsimile transmission, said information query includes queries for addressee name, addressee facsimile number, number of pages in facsimile transmission, date facsimile is transmitted, sender name, sender telephone number and subject of facsimile transmission.

6. The method of claim 4, wherein when said desired format for said communication is a letter, said information query includes queries for addressee name, addressee mailing address, date letter is sent, sender name, sender mailing address and subject of letter.

7. The method of claim 4, wherein when said desired format for said communication is a memorandum, said information query includes queries for addressee name, addressee mailing address, date memorandum is prepared or sent, sender name, sender mailing address, and subject of memorandum.

8. The method of claim 1, wherein said step of analyzing said text document comprises the steps of:

analyzing said message content to find said identified concise address information and answering at least one of said information queries with said identified concise address information.

9. The method of claim 8, wherein said format template includes a plurality of information slots, and wherein said step of analyzing said message content based upon said information query comprises the steps of:

(1) associating a query index number Q with said information query, where the query index numbers form a set of consecutive integers with a smallest integer $Q_{min}$ and a largest integer $Q_{max}$, and initially setting $Q=Q_{min}$;

(2) if $Q \leq Q_{max}$, proceeding to step (3), and if $Q > Q_{max}$, proceeding to step (7);

(3) analyzing said message content to determine if said message content contains identified concise address information that answers said information query associated with query index Q;

(4) if said message content does not contain identified concise address information that answers said information query associated with query index Q, marking said query index Q and proceeding to step (6);

(5) if said message content contains identified concise address information that answers said information query associated with query index Q, placing this identified concise address information in one of said identification slots of said format template for said desired format;

(6) replacing Q by Q+1 and returning to step (2); and (7) indicating which, if any, of said information queries cannot be answered based upon information in said message content.

10. The method of claim 1, further comprising the step of displaying said communication, including said filled template portion and said body portion on a computer system display screen.

11. The method of claim 1, wherein said step of analyzing said text document comprises the step of determining whether one or more time indications appears in said text document.

12. The method of claim 11, wherein said step of determining whether one or more time indications appears in said text document comprises the steps of:

(1) determining whether said text document contains a word or phrase of the form ab:cd, where a, b, c and d are characters satisfying the constraints
a=(space), 0, 1 or 2,
b=0, 1, 2, . . . , or 9,
c=0, 1, 2, 3, 4 or 5, and
d=0, 1, 2, . . . , or 9;

(2) determining whether said text document contains a word or phrase of the form ef:gh, where e, f, g and h are characters satisfying the constraints
e=(space), 0 or 1,
f=0, 1, 2, . . . , or 9,
g=0, 1, 2, 3, 4 or 5, and
h=0, 1, 2, . . . , or 9;

(3) determining whether said text document contains a word or phrase of the form "minutes before jk" or "minutes after jk", where j and k are characters satisfying the constraints
j=(space), 0, 1 or 2, and
k=0, 1, 2, . . . , or 9;

(4) determining whether said text document contains a word or phrase of the form "mn o'clock", where m and n are characters satisfying the constraints
m=(space), 0, 1 or 2,
n=0, 1, 2, . . . , or 9;

(5) determining whether said text document contains a word or phrase of the form "12 noon" or "12 midnight"; and (6) determining whether said text document contains a word or phrase of the form "rs fifteen", "rs thirty", or "rs forty-five", where r and s are characters satisfying the constraints
r=(space), 0, 1 or 2, and
s=0, 1, 2, . . . , or 9.

13. The method of claim 1, wherein said step of analyzing said text document includes determining whether one or more dates appears in said text document.

14. The method of claim 13, wherein said step of determining whether one or more dates appears in said text document comprises the steps of:

(1) determining whether said text document contains a word or phrase of the form ab/cd/efgh, where a, b, c, d, e, f, g and h are characters satisfying the constraints
a=(space), 0 or 1,
b=0, 1 or 2,
c=(space), 0, 1, 2 or 3,
d=0, 1, 2, . . . , or 9,
e=(space), 1 or 2,
f=(space), 0, 1, 2, . . . , or 9,
g=0, 1, 2, . . . , or 9, and
h=0, 1, 2, . . . , or 9;

(2) determining whether said text document contains a word or phrase of the form ab-cd-efgh, where a, b, c, d, e, f, g and h are characters satisfying the constraints
a=(space), 0, 1 or 2,
b=0, 1, 2, . . . , or 9,
c=(space), 0 or 1,
d=0, 1 or 2,
e=(space), 1 or 2,
f=(space), 0, 1, 2, . . . , or 9,
g=0, 1, 2, . . . , or 9, and
h=0, 1, 2, . . . , or 9;

(3) determining whether said text document contains a word or phrase of the form ab/cd/efgh, where a, b, c, d, e, f, g and h are characters satisfying the constraints
a=(space), 0, 1, 2 or 3,
b=0, 1, 2, . . . , or 9,
c=(space), 0 or 1,
d=0, 1 or 2,
e=(space), 1 or 2,
f=(space), 0, 1, 2, . . . , or 9,
g=0, 1, 2, . . . , or 9, and
h=0, 1, 2, . . . , or 9;

(4) determining whether said text document contains a word or phrase of the form ab-cd-efgh, where a, b, c, d, e, f, g and h are characters satisfying the constraints
a=(space), 0, 1, 2 or 3,
b=0, 1, 2, . . . , or 9,
c=(space), 0 or 1,
d=0, 1 or 2,
e=(space), 1 or 2,
f=(space), 0, 1, 2, . . . , or 9,
g=0, 1, 2, . . . , or 9, and
h=0, 1, 2, . . . , or 9;

(5) determining whether said text document contains a word or phrase of the form (word1)/jk/mnpq or jk/(word1)/mnpq, where j, k, m, n, p and q are characters and word1 is a word or abbreviation satisfying the constraints
j=(space), 1, 2 or 3,
k=0, 1, 2, . . . , or 9,
m=(space), 1 or 2,
n=(space), 0, 1, 2, . . . , or 9,
p=0, 1, 2, . . . . or 9,
q=0, 1, 2, . . . , or 9, and
word1=jan, january, feb, february, mar, march, apr, april, may, jun, june, jul, july, aug, august, sep, sept, september, oct, october, nov, november, dec or december;

(6) determining whether said text document contains a word or phrase of the form (word2)-jk-mnpq or jk-(word2)-mnpq, where j, k, m, n, p and q are characters and word2 is a word or abbreviation satisfying the constraints
j=(space), 1, 2 or 3,
k=0, 1, 2 . . . , or 9,
m=(space), 1 or 2,
n=(space), 0, 1, 2, . . . , or 9,
p=0, 1, 2, . . . , or 9,
q=0, 1, 2, . . . , or 9, and
word2=jan, january, feb, february, mar, march, apr, april, may, jun, june, jul, july, aug, august, sep, sept, september, oct, october, nov, november, dec or december;

(7) determining whether said text document contains a word or phrase of the form (word3), rs, tuvw or rs (word3) tuvw, where r, s, t, u, v and w are characters and word3 is a word or abbreviation satisfying the constraints
r=(space), 1, 2 or 3, s=0, 1, 2, . . . , or 9,
t=(space), 1 or 2,
u=(space), 0, 1, 2, . . . , or 9,
v=0, 1, 2 . . . . , or 9,
w=0, 1, 2, . . . , or 9, and
word3=jan, january, feb, february, mar, march, apr, april, may, jun, june, jul, july, aug, august, sep, sept, september, oct, october, nov, november, dec or december; and (8) determining whether said text document contains a word or phrase of the form (word4)-rs-tuvw or rs-(word4)-tuvw, where r, s, t, u, v and w are characters and word4 is a word or abbreviation satisfying the constraints
r=(space), 1, 2 or 3,
s=0, 1, 2, . . . , or 9,
t=(space), 1 or 2,
u=(space), 0, 1, 2, . . . , or 9,
v=0, 1, 2, . . . , or 9,
w=0, 1, 2, . . . , or 9, and
word4=jan, january, feb, february, mar, march, apr, april, may, jun, june, jul, july, aug, august, sep, sept, september, oct, october, nov, november, dec or december.

15. The method of claim 1, wherein said step of entering said text document comprises the steps of:
providing a pen-based computer system having a tablet for entering information into said computer system; and
entering said object into said computer system using the pen and tablet.

16. The method of claim 1, wherein said step of entering said text document comprises the steps of:
providing said computer system with a keyboard for entering information into said computer system; and
entering said text document into said computer system using the keyboard.

17. A method as recited in claim 1 further comprising a step of displaying information queries which could not be answered by information included in said text document.

18. A method as recited in claim 1 wherein said original format of said text document is selected from the group consisting of facsimile, letter, and memorandum.

19. A method as recited in claim 1 wherein said information queries also identify address information in said main body portion of said text document that is not stored on a separate database and is filled in said template.

20. A method as recited in claim 1 wherein said concise address information in said text document includes an abbreviated name of said addressee and wherein said database address information includes a full name of said addressee corresponding to said abbreviated name.

21. A method as recited in claim 20 wherein said abbreviated name and a name of a sender of said communication are identified by searching for predetermined connective words which are located in said text document.

22. A method as recited in claim 1 wherein said format template includes a plurality of information slots, wherein said concise address information in said text document includes a name of said addressee, and wherein said retrieved database address information includes additional address information of said addressee which is sufficient to fill in said plurality of information slots in said format template.

23. A method as recited in claim 1 wherein said step of analyzing the text document further comprises identifying concise message content in said main body portion of said text document that answers said query and filling in said information slot with database message information stored in and retrieved from a database separate from said text document, said database message information being referred to by said identified concise message content and providing greater detail than said concise message address contents.

24. Apparatus for automated preparation of a communication from an object containing text and/or graphics, the apparatus comprising:
information entry means for entering an object including text and having an original format from which a communication is to be created, said object including message content for said addressee, said message content including address information of said addressee, wherein said address information and said message content are both located within a main body portion of theobject and are not provided in a heading separate from said message content; and
a computer system to receive the object, to analyze the object and automatically determine a desired communication format for said communication from information in said message content such that said desired communication format is different from said original format, to determine a template corresponding to the desired communication format, to determine a set of information queries that are associated with the template and which query for said address information in said object, to identify and place in slots of the template answers to the queries that are available from the object, wherein at least some of said answers include separate address information that is stored separate from said object and is referred to by an address identifier in said main body portion of said object that is less detailed than said separate address information, and to create said communication from the object, said communication including said address information and said message content.

25. The apparatus of claim 24, further comprising a display connected to said computer system for displaying said communication in said desired format.

26. The apparatus of claim 24, wherein said computer system distinguishes between necessary first level queries and optional second level queries for said information queries associated with said template, wherein said first level queries include a query for a sending address for said addressee, and wherein said second level queries include queries for a name of said addressee and a name of a sender who is sending said communication to said addressee.

27. The apparatus of claim 24, wherein said desired communication format is selected from the group consisting of a facsimile transmission, a letter and a memorandum.

28. The apparatus of claim 24, wherein said computer system determines whether one or more dates appears in said object.

29. The apparatus of claim 24, wherein said computer system determines whether one or more time indications appears in said object.

30. The apparatus of claim 24, wherein said information entry means comprises a pen and tablet, connected to said computer system, that permits entry of text information or graphics information or both text and graphics information into said computer system.

31. The apparatus of claim 24, wherein said information entry means comprises a keyboard, connected to said computer system, that permits entry of text information into said computer system.

32. A method as recited in claim 24 wherein said address information includes geographic locations and events in said object which are identified by:

ignoring articles and connective words included in said object; and searching for said geographic locations and events in said object that match a list of geographic locations and events stored on a separate database.

33. A method for formatting a text object into a communication comprising the steps of:

selecting a text object having an original format and having address information for determining an address of a recipient of a formatted communication and message information to be provided as message content for said recipient, said message and address information being included in a main body portion of said text object;

selecting a format type for said formatted communication such that said format type is different from said original format, wherein said format type is selected from the group consisting of facsimile, letter, and memorandum;

searching said text object for said message information required to complete said formatted communication and a database referred to by said text object for derailed message information required to complete said formatted communication, wherein said detailed message information on said database is referred to by abbreviated message information included in said text object; and creating said formatted communication having said format type utilizing said text object, said format type, said address information, said message information found in said text object and said detailed message information found on said database, wherein said formatted communication includes said address information in an addressee portion of said formatted communication and said message information and said detailed message information in a message portion of said formatted communication.

34. A method as recited in claim 33 wherein said step of searching additionally searches for said address information required to complete said formatted communication.

35. A method as recited in claim 34 wherein said address information in said text object is abbreviated address information that serves to locate more detailed address information stored separately in a database, wherein said more detailed address information is inserted in said formatted communication.

36. A method as recited in claim 33 wherein said step of selecting a format type is accomplished by an explicit command from a user.

37. A method as recited in claim 33 wherein said step of selecting a format type is accomplished by an implicit command from a user and a search of said text object for information associated with a format type.

38. A method as recited in claim 33 wherein said original format is selected from the group consisting of facsimile, letter and memorandum.

39. A computer implemented method for formatting a communication, the method comprising the computer implemented steps of:

receiving a text document into a computer system, said text document including a message portion, an address identifier and a format identifier all located within a main body portion of the text document such that neither said address identifier nor said format identifier is provided in a heading separate from said message portion;

searching said text document to locate said format identifier and determining a desired communication format based upon said format identifier;

associating a format template with said desired communication format, said format template having an address information slot and an address information query associated with said address information slot;

analyzing said text document based upon said information query to locate said address identifier;

accessing an address information database separate from said text document utilizing said address identifier as a reference and obtaining a selected address from said address information database;

filling in said address information slot with said selected address obtained from said address information database; and creating a formatted communication having said desired communication format in accordance with said format template, said desired communication format being different than an original format of said text document, said communication including a template portion and a body portion, said template portion including at least a portion of said selected address and said body portion including said message portion of said text document.

40. A method as recited in claim 39 wherein said address identifier in said text document includes an abbreviated name and wherein said selected address from said address information database includes a full name corresponding to said abbreviated name.

41. A method as recited in claim 40 wherein said message portion, format identifier, and address identifier include text characters, and wherein said abbreviated name is identified by searching for predetermined connective words in said text document that are located within a predetermined amount of said text characters surrounding said format identifier.

42. A method as recited in claim 39 wherein said format template includes a plurality of address information slots, wherein said concise address information in said text document includes a name of said addressee, and wherein said retrieved database address information includes additional address information sufficient to fill in at least two of said plurality of information slots in said format template.

43. A method as recited in claim 42 wherein said additional address information includes at least one of a fax number, a phone number, and a mailing address.

44. A method as recited in claim 39 wherein said address information includes geographic locations and events in said text document which are identified by:

ignoring articles and connective words included in said message portion; and searching said message portion for said geographic locations and events that match a list of geographic locations and events stored on a separate database.

45. A method as recited in claim 39 further comprising a step of analyzing the text document to locate a message identifier that answers said query, identifying database message content stored in a database separate from said text document and referred to by said message identifier, and inserting said database message content in said communication.

* * * * *